Jan. 8, 1963  H. A. FAERBER  3,072,078
CONFECTIONERY MOULDING MACHINE
Filed May 2, 1960 5 Sheets-Sheet 1

INVENTOR
HANS A FAERBER
By (signature) Atty.

Jan. 8, 1963  H. A. FAERBER  3,072,078
CONFECTIONERY MOULDING MACHINE
Filed May 2, 1960  5 Sheets-Sheet 2

INVENTOR
HANS A. FAERBER

Jan. 8, 1963 H. A. FAERBER 3,072,078
CONFECTIONERY MOULDING MACHINE
Filed May 2, 1960 5 Sheets-Sheet 3

INVENTOR
HANS A. FAERBER

Jan. 8, 1963  H. A. FAERBER  3,072,078
CONFECTIONERY MOULDING MACHINE
Filed May 2, 1960  5 Sheets-Sheet 4
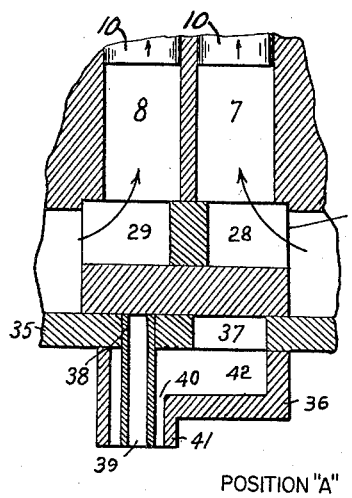
POSITION "A"
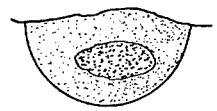
Fig. 5.
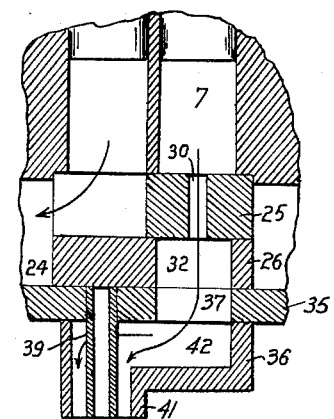
POSITION "B"
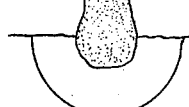
Fig. 6.
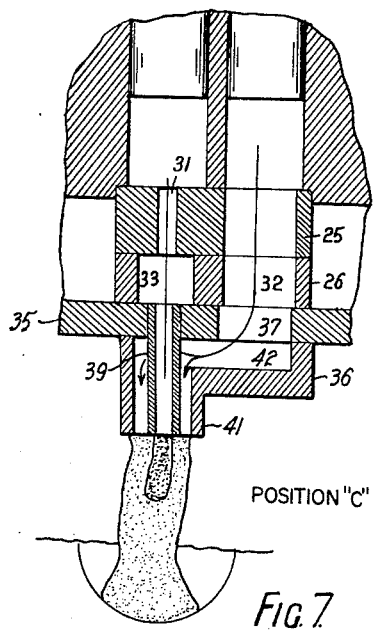
POSITION "C"
Fig. 7.
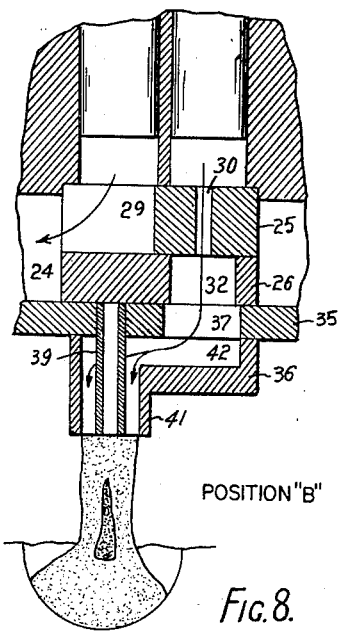
POSITION "B"
Fig. 8.
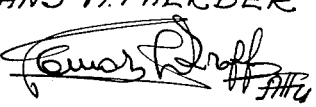
INVENTOR
HANS A. FAERBER
BY Jan. 8, 1963 H. A. FAERBER 3,072,078
CONFECTIONERY MOULDING MACHINE
Filed May 2, 1960 5 Sheets-Sheet 5

INVENTOR
HANS A FAERBER

United States Patent Office 3,072,078
Patented Jan. 8, 1963

3,072,078
CONFECTIONERY MOULDING MACHINE
Hans Arthur Faerber, 37-39 Shepherd St., Chippendale, near Sydney, New South Wales, Australia
Filed May 2, 1960, Ser. No. 25,939
5 Claims. (Cl. 107—1)

This invention has been devised to provide a machine for the manufacture of confections which comprise a shell and a core.

One machine as constructed hitherto to make such confections had a single hopper divided into two compartments, one for the shell material and the other for the core material. These compartments were connected to a battery of pumps, that is to say, there were two pumps for each mould to be filled by the operation of the machine, and the moulds were formed in starch or the like in trays which were passed through the filling position.

The adjustments for one of the groups of pumps for volume and timing of delivery of one of the materials was by a mechanical device, such as a can, and the adjustments of the other group of pumps for volume and timing of delivery was by an arrangement of parts to achieve a lost motion, which was increased or decreased to comply with the volume and timing required.

In such a machine, it was difficult to obtain the fine adjustment required for a determined deposit of the respective ingredients, that is the shell and the core.

Variations can be occasioned by changes in temperature of the confections and variations in the type of confection. Over a period of operation stoppages were necessary to adjust the machine to changing conditions and/or temperature.

The machine of the present invention is of the type described in applicant's Australian Patent No. 229,189, accepted June 22, 1960 and the parts of such a machine not described herein follow the general construction described in the said patent.

According to this invention, two independent hoppers, one for shell material and one for core material are connected one to each row of a battery of metering pumps consisting of a bank of barrels in a body in two rows, each barrel having a plunger therein, all the plungers being connected to an actuating mechanism common to all of them. There is a valve chamber in the bottom of the pump body incorporating a valve face and separate ports connect the pump barrels to the valve face. A shuttle valve is mounted in the valve chamber in register with the valve face, and means are incorporated to reciprocate the shuttle valve and other means to adjust the setting thereof for the purpose of independently controlling the delivery from the shell material pumps and the core material pumps. A ducting chamber is mounted below the shuttle valve and in register therewith. The ducting chamber has one set of ports for each pair of barrels (a pair of barrels being a shell material barrel and a core material barrel) and one delivery nozzle for each pair of barrels. The port associated through the shuttle valve with each core material pump extends to an outlet located concentrically within an outlet from the port associated through the shuttle valve with each shell material pump and both outlets are located in the delivery nozzle.

Two distinct types of composite deposit can be produced; one of these consists of a core of material enclosed within a shell of another material; the other consists of a layer of one material placed between two layers of the other material.

The invention is described in further detail with reference to the annexed drawings wherein.

FIGURES 5 to 12 inclusive are fragmentary diagrammatic views showing different forms of deposits of shell material and core material into moulds.

Figure 1:
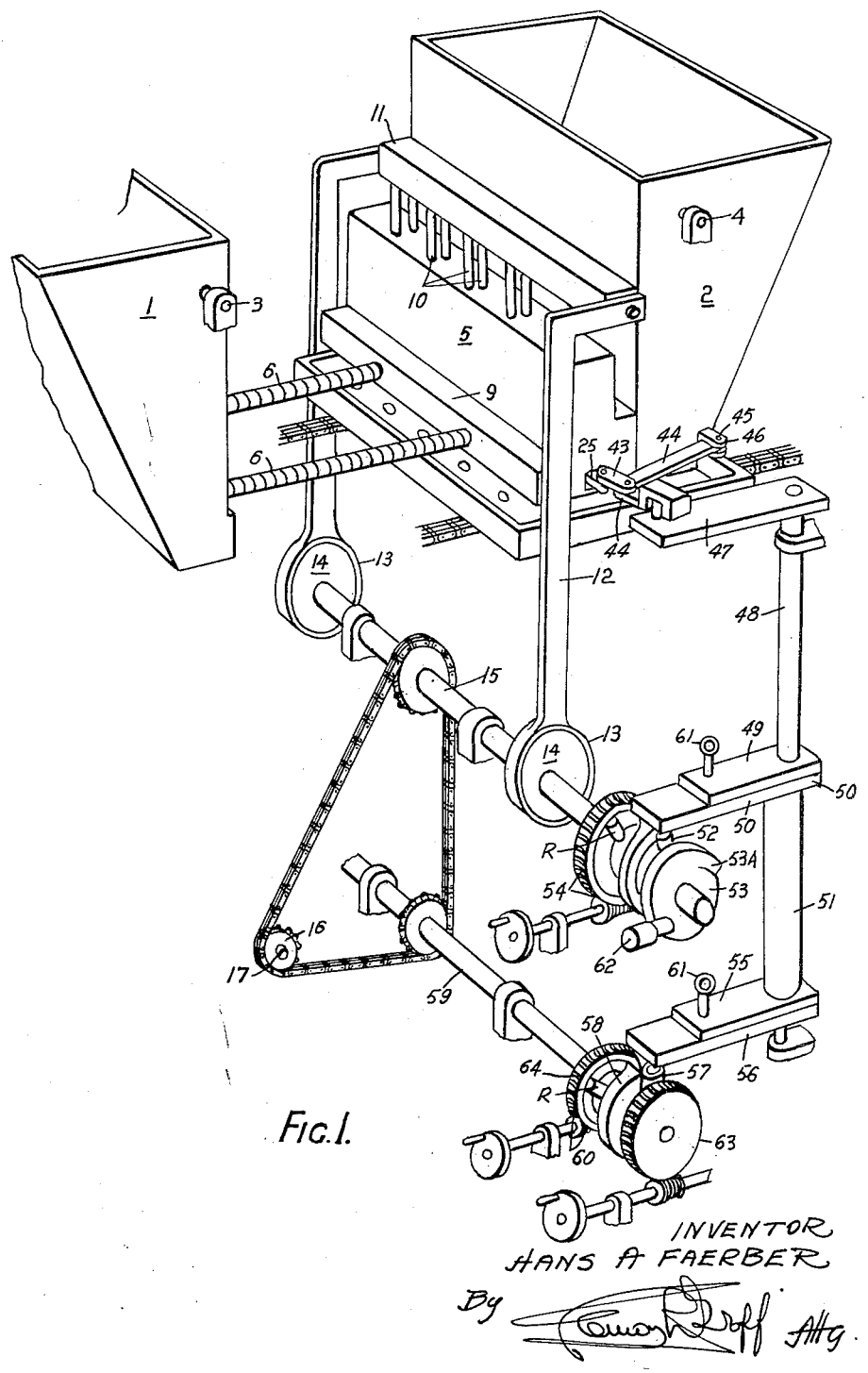
FIGURE 1 is a perspective view of a pair of hoppers and pumps and associated mechanism and one form of actuating means.

As illustrated in FIGURE 1 the two independent hoppers 1 and 2 are mounted at positions 3 and 4 for swinging movement to synchronize with the continuous movement of the mould trays through the machine. A battery of metering pumps disposed in a body 5 is attached to hopper 2 and it is connected to the hopper 1 by flexible pipes 6 which will permit movement of one hopper relative to the other.

Where the trays are moved through the machine with an intermittent motion and the hoppers are not arranged to swing the flexible pipes 6 are dispensed with and the hopper 1 is attached to the pump assemblies in the same manner as the hopper 2. Conventional means are incorporated to maintain a determined temperature in the hoppers 1 and 2 which can be varied according to the type of confection being made. As illustrated, the hopper 1 is used for the shell material and hopper 2 is used for the core material.

The metering pump consists of a bank of barrels 7 and 8 in two rows. The pipes 6 connect the hopper 1 to a manifold 9 which admits shell material to pump barrels 7 as will be described later. The hopper 2 has an outlet extending the length thereof and the manner of admitting core material to the pump barrels 8 will also be described later.

Plungers 10 in the barrels 7 and 8 are connected to an actuating mechanism which is common to both rows of plungers and both rows of plungers are actuated uniformly and simultaneously.

FIGURE 1 illustrates one form of actuating mechanism wherein the plungers 10 are connected to a crosshead 11. Rods 12 pivotally connected to the crosshead 11 at each end thereof are fixed to straps 13 on eccentrics 14 on a shaft 15 and this shaft 15 is driven by a chain and sprocket drive 16 from a drive shaft 17.

A valve chamber in the form of a transverse recess 18 is formed in the bottom of the pump body. It has a valve face 19 and ports 20 and 20a connect the barrels 7 and 8 to the valve face. The manifold 9 has two ports 21 and 22 connecting to the valve chamber 18 for each barrel 7. The hopper 2 is connected to the valve chamber 18 by two ports 23 and 24 for each barrel 8.

Figure 2:
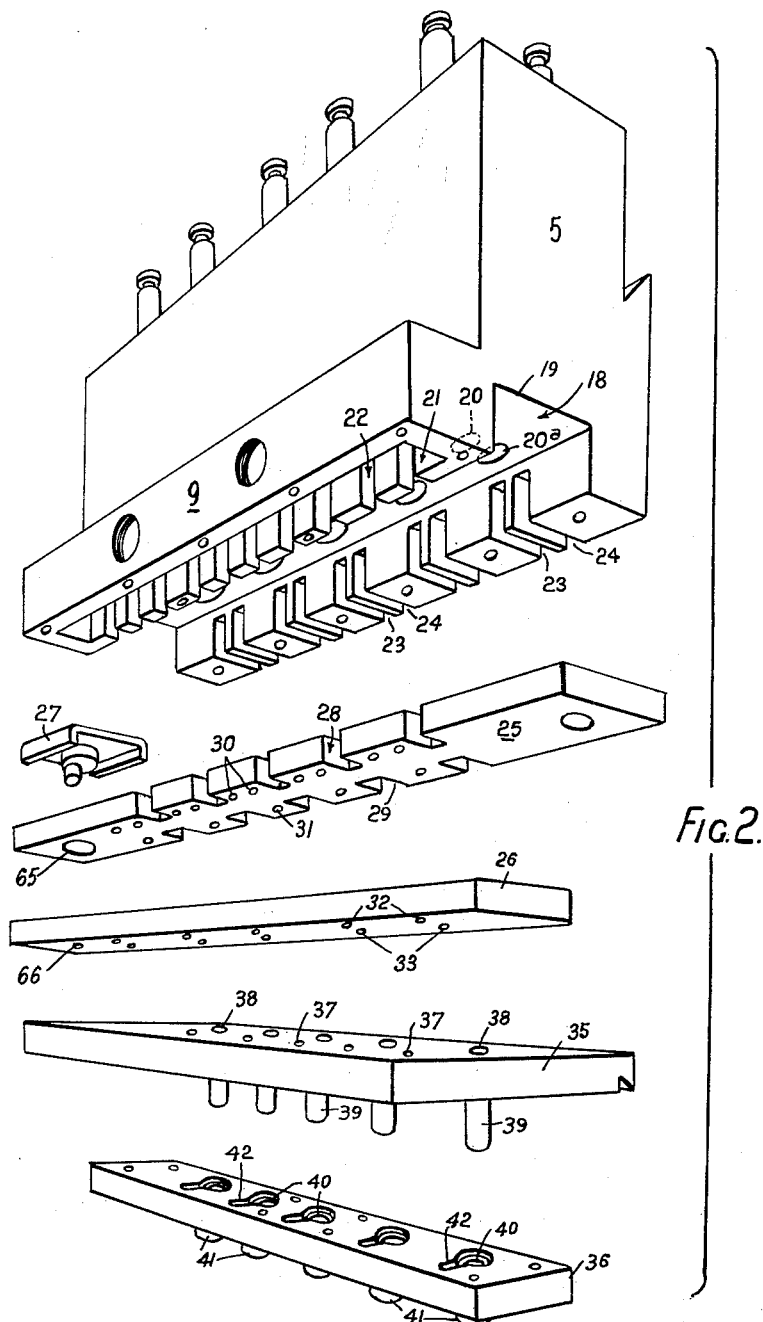
FIGURE 2 is an exploded perspective view of a battery of pumps and associated mechanism.

The shuttle valve consists of two bars 25 and 26, the bar 25 being mounted upon the bar 26. The bars are connected together at one end by a cam unit 27 which holds the two bars in either of two selected positions relative to each other. The relative positions of the parts 25 and 26 constituting the shuttle valve are obtained by rotation of the cam unit 27 in holes 65, 66 (see FIGURE 2). The cam unit 27 is lifted and turned manually to obtain the desired relative positions of bars 25 and 26 and the flange sides of the cam unit engage the sides of bar 25 to prevent the cam unit from turning. The cam unit then simply holds by gravity.

Figure 3:
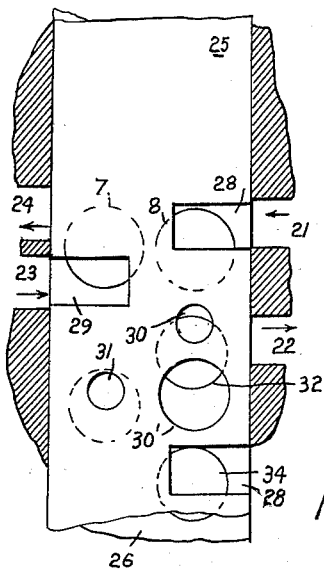
FIGURES 3 and 4 are fragmentary diagrammatic views of the arrangement of ports.

FIGURE 3 shows the setting of the shuttle valve bars to achieve a confection wherein the core material is embedded in the shell material.

Figure 4:
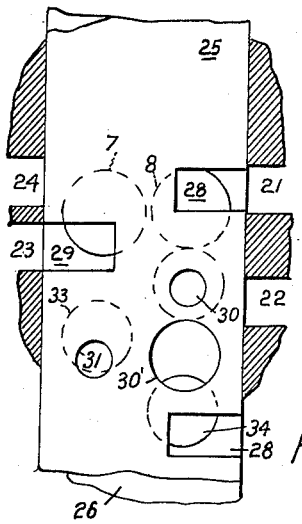
Figure 9:
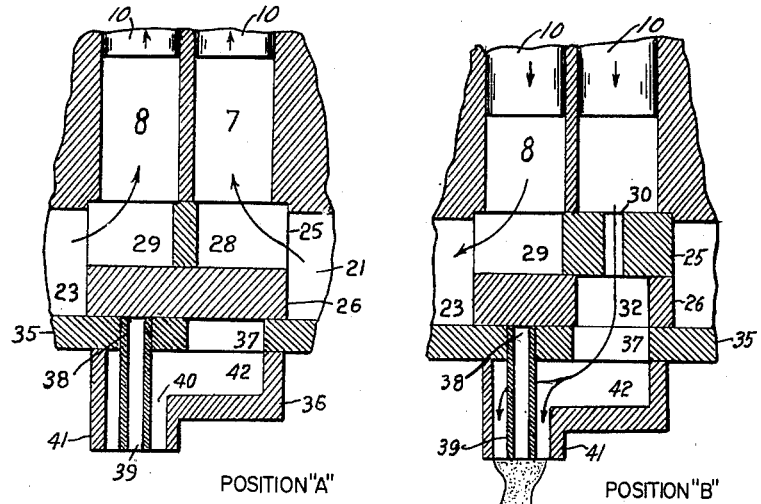
Figure 9:
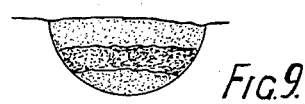
Figure 10:
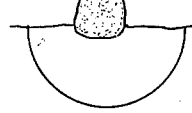

FIGURE 4 shows the setting of the shuttle valve bars to achieve a sandwich-type confection.

At the other end, the bar 25 has means for connecting to a reciprocating mechanism which will be described later.

In the sides of the bar 25, there are slot ports 28 and 29 respectively, one for each of the barrels 7 and 8. These ports are adapted on reciprocation of the shuttle valve to register with the ports 21 and 22 and 23 and 24 respectively. These ports 28 and 29 permit shell and core material to be drawn from the hoppers 1 and 2 into the barrels 7 and 8 and under certain conditions of operation which will be explained later, permit the material to be pumped back to the respective hoppers.

There are a series of ports through the bar 25, namely twin ports 30 and 30′ and single ports 31. The ports 30 and 30′ connect to the shell material pump outlets 20 and the ports 31 connect to the core material pump outlets 20a. In the bar 26 there is one port 32 for the shell material delivery and a second port 33 for the delivery of the core material. In addition (see FIGURES 3 and 4) there is a blind port or recess 34 in the bar 26 which enables the shell material to be returned back to the shell hopper during the making of a particular type of confection which will be described later. In this connection, it should be noted that the ports 30′ are of larger diameter than ports 30 so that upon adjustment of the shuttle valve to the position shown in FIGURE 4, the return of the shell material to the hopper will be properly effected.

The ducting chamber consists of two units 35 and 36. In the unit 35, there is a series of through ports 37 for the shell material and a series of through ports 38 for the "core" material. The "core" ports extend into pipes 39 which project from the unit 35 through cavities 40 in the unit 36—which are larger than the pipes 39—and into nozzle outlets 41 fixed to the unit 36. In the top of each cavity 40, there is a duct 42 which registers with the port 37 and permits shell material to flow through the annulus formed by the pipe 39 into the nozzle outlet 41.

The actuating means for the shuttle valve 25, 26 consists of a link 43 whereby the bar 25 is connected to a bell crank 44. The long limb of the bell crank is pivotally mounted as at 45 in a bracket 46 and the short limb slidably engages a crank 47 on an oscillatable shaft 48. The oscillatable shaft 48 has a clutch arm 49 fixed thereto and which is adapted to lock onto a crank 50 on a sleeve 51 free of the shaft 48. The crank 50 has a pin 52 in a cam track 53 on the shaft 15. The position of the cam track 53 on this shaft 15 is adjusted by a worm and worm gear referred to generally as 54. This adjustment is provided to regulate the timing of the operation of the shuttle valve which will be described later. The sleeve 51 has a second clutch arm 55 adapted to be locked onto a crank 56 having a pin 57 engaging a second cam track 58 on a shaft 59 driven by chain and sprocket means 16 from drive shaft 17. Worm and worm gear means 60 such as described with reference to cam track 53 are incorporated as shown in FIGURE 1 to adjust the position of the cam track 58. A crank 50, sleeve 51, and the second clutch arm 55 are all fixed together and are oscillatable on shaft 48, while crank 56 is free on shaft 48. Clutch pins 61 are provided for connecting the parts 49 and 50, 55 and 56, as desired.

The worm gears 54, 63 and 64 each have a roller R thereon. The roller R of worm gear 54 co-acts with cam 53 to move the shuttle valve when clutch arm 49 is connected by clutch pin 61 to crank 50. The rollers R of worm gears 63 and 64 co-act with cam 58 to move the shuttle valve when clutch arm 55 is connected by clutch pin 61 to crank 56. It will be understood that the roller R of worm gear 63 is not seen in FIGURE 1.

In addition, a fixed roller 62 is provided which co-acts with a cam lobe 53a on cam 53, to move the shuttle valve back to a position A ("commencement position"), to be referred to in greater detail hereafter.

When the machine is used only to deposit shell material the clutch arm 49 is engaged by pin 61 with clutch arm 50 and the clutch arm 55 is disengaged by lifting its pin 61 out of clutch arm 56; when the machine is used to deposit a shell material and a core material within the shell or as a "sandwich" both clutches 49 and 55 are engaged and the cam tracks 53 and 58 are arranged to move the shuttle valve 25—26 through positions referred to as (commencement position) A to B, B to C, C back to B, and B back to A. (See FIGURES 5 to 12.) The cam track 53 and associated mechanism moves the shuttle valve through the position A to B to start a deposit of shell material and it also moves the shuttle valve back from B to A to terminate a shell deposit. The cam track 58 and associated mechanism moves the shuttle valve from B to C to start a core deposit and moves the shuttle valve back from C to B to terminate a core deposit. The worm gears on both units permit of the correct adjustment of the timing of the tracks to effect the above described movement.

Figure 11:
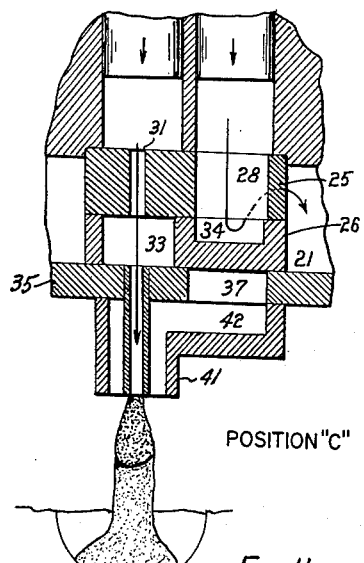
Figure 12:
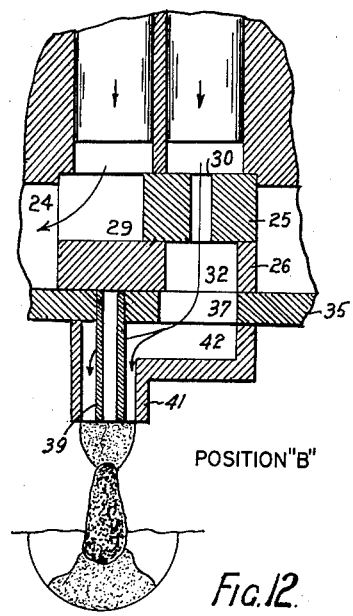

FIGURES 5 to 8 show the operations from A to B, B to C, C back to B, and finally back to the first position A, for the making of a confection wherein the core material is embedded in the shell material. FIGURE 3 shows the relative positions of the shuttle valve members 25 and 26 to achieve this form. FIGURE 5 shows also the completed confection. When the shuttle valve is in the position shown in FIGURE 6 the shell material from the barrels 7 passes through the ports 30 in the shuttle valve member 25, through ports 32 in the shuttle valve member 26 and then through ports 37 in the ducting unit 35 and through the annulus, and the nozzle outlet 41. During this operation, the core material passes from the pumps 8 through ports 29 and 24 back into the core material hopper 2. In the step of the operation shown in FIGURE 7 the shell material still passes through the same ports but by movement of the shuttle valve, the core material passes through ports 31 and 33 into the pipes 39, to be ejected from the nozzle outlet 41 into the centre of the shell material. As shown in FIGURE 8, the deposit of the core material has been terminated by movement of the shuttle valve and is flowing back to hopper as shown in FIGURE 5. FIGURE 4 shows the setting of the shuttle valve components for the making of a sandwich type confection and the only difference between FIGURES 5 to 8 and 9 to 11, is shown in FIGURE 11 where by operation of the shuttle setting, the shell material after an initial deposit is diverted through blind port 34, through the slot 28 and into the port 21 and back to the hopper 1 during the period the core material is being deposited as a layer on top of the previously deposited shell material. After this operation has been completed, the movement of the shuttle valve directs further core material back to its hopper and a further supply of shell material into the mould to complete the confection.

By way of further explanation of the function of members 53 to 58, it is pointed out that in stage 1 (A to B) the motion of the shuttle valve members 25 and 26 is produced by the roller of the worm gear 54 via the cam 53 and its roller 52, to move the shuttle valve from position A to position B.

In stage 2 (B to C) the motion of the shuttle valve members 25 and 26 is produced by the roller of the worm gear 64 via the cam 58 to move the shuttle valve from position B to position C.

In stage 3 (C back to B), the motion of the shuttle valve members 25 and 26 is produced by the roller of the worm gear 63 acting on the cam 58 to move the shuttle valve from position C back to position B.

In stage 4 (B back to A), the motion of the shuttle valve members 25 and 26 is produced by the fixed roller 62 acting on cam lobe 53a of cam 53 to move the shuttle valve from position B to position A.

Stage 4 is the termination of a full deposit cycle and must occur at the bottom of the stroke of the plungers 10. In view of this, no timing adjustment is provided for this motion, whereas timing adjustment is provided for stages 1, 2 and 3 by the worm gears 54, 64 and 63, respectively, to vary the volumes of shell material and core material deposited between these stages. Further, in the position between stages 2 and 3, the timing varies the vertical location of the core material in the shell.

An advantage resulting from the construction and operation of the shuttle valve assembly is that the surplus shell material and core material over a particular deposit is circulated back to the respective hoppers thus maintaining the desired consistency of the respective materials.

I claim:

1. A confectionery molding machine having a shell material hopper and a core material hopper each of which is pivotally mounted to synchronize with the continuous movement of mold trays through the machine, a battery of metering pumps disposed within a body, said metering pumps including a bank of barrels arranged in two parallel rows, means connecting the first row of barrels with said shell material hopper and means connecting the second row of barrels with said core material hopper, plungers slidably disposed in each row of barrels, means for actuating both rows of plungers uniformly and simultaneously, a valve chamber in the bottom of said body, said valve chamber having a valve face and separate ports connecting the barrels of each row of pumps to said valve face, a shuttle valve mounted in the valve chamber in registry with the valve face, said shuttle valve comprising a pair of bars mounted one above the other, cam means at one end of each of said bars connecting them together for selected positioning relative to each other, the uppermost bar having a plurality of slotted openings on opposite sides thereof, the number of openings corresponding to the number of barrels of said metering pumps and providing communication between said pumps and their related hoppers, the uppermost bar also having a series of through twin ports disposed adjacent said slotted openings and adapted to register with the shell material pump ports, said uppermost bar also having a series of through single ports disposed adjacent said slotted openings on the opposite side of said bar and adapted to register with thet core material pump ports, said lower bar having a series of through single ports for each shell material pump and a series of through single ports for each core material pump, said lower bar also having a blind port connecting the shell material port with one of the twin ports in the upper bar, means to reciprocate the shuttle valve and means to adjust the setting thereof for the purpose of independently controlling the delivery from the shell material pumps and the core material pumps, a ducting chamber mounted below said shuttle valve and in registry therewith, said ducting chamber having two rows of through ports, one port for each of said barrels, and also having one delivery nozzle for each pair of barrels, the port which is associated through the shuttle valve with each core material barrel, extending to an outlet located concentrically within an outlet, said last mentioned outlet communicating with the port which is associated through the shuttle valve with each shell material barrel, both of said outlets being located in said delivery nozzle.

2. A confectionery molding machine according to claim 1 wherein the means for actuating said pump plungers comprises a crosshead to which the upper ends of said plungers are connected, rods pivotally connected to said crosshead at each end thereof, each of said rods fixed to a strap mounted on an eccentric, said eccentric mounted on a shaft and drive means for said shaft.

3. A confectionery molding machine according to claim 1 wherein the hoppers are each connected to the valve chamber through two ports for each barrel, said ports located in the respective sides of the valve chamber.

4. A confectionery molding machine according to claim 1 wherein the ducting chamber comprises two units, one mounted on top of the other, said upper unit having through ports for shell material from each pump and through ports for core material from each pump; said core ports being extended into pipes projecting from said upper unit and through cavities in said lower unit which are larger than said pipes and into nozzle outlets on said bottom unit, each of said cavities having a duct in registry with the shell material ports in the upper unit.

5. A confectionery molding machine according to claim 1 wherein the actuating means for the shuttle valve comprises a link connecting the shuttle valve to a bell crank having one limb pivotally mounted on a support and the other limb in sliding engagement with a carnk on an oscillatable shaft having a clutch arm and means to lock said clutch arm on a crank on a sleeve mounted freely on said shaft; said crank having a pin in a cam track on a driven shaft, means to adjust the position of said cam track, said sleeve having a second clutch arm and means to lock said clutch arm on a crank having a pin in a second cam track on a second driven shaft and means to adjust the position of said cam track.

References Cited in the file of this patent

UNITED STATES PATENTS

| 544,962 | Copland | Aug. 20, 1895 |
| 1,711,750 | Schoppner | May 7, 1929 |
| 2,032,812 | Quattrin et al. | Mar. 3, 1936 |
| 2,202,917 | Oswalt | June 4, 1940 |
| 2,649,744 | Elwell | Aug. 25, 1953 |

FOREIGN PATENTS

| 1,132,821 | France | Nov. 5, 1956 |